US007171308B2

(12) United States Patent
Campbell

(10) Patent No.: US 7,171,308 B2
(45) Date of Patent: Jan. 30, 2007

(54) WEATHER STATION

(75) Inventor: Dwayne Campbell, Fort Worth, TX (US)

(73) Assignee: Radio Shack Corporation, Fort Worth, TX (US)

( * ) Notice: Subject to any disclaimer, the term of this patent is extended or adjusted under 35 U.S.C. 154(b) by 0 days.

(21) Appl. No.: 10/978,295

(22) Filed: Oct. 29, 2004

(65) Prior Publication Data

US 2006/0106540 A1 May 18, 2006

(51) Int. Cl.
*G06F 19/00* (2006.01)
*G01W 1/00* (2006.01)
(52) U.S. Cl. ........................................ 702/4; 73/170.24
(58) Field of Classification Search ................ 702/4, 702/3; 342/460, 26; 340/601; 324/72, 457; 455/67.13; 73/170.24
See application file for complete search history.

(56) References Cited

U.S. PATENT DOCUMENTS

| 3,891,919 | A | * | 6/1975 | Penninger | 324/72 |
| 4,543,580 | A | * | 9/1985 | Bent et al. | 342/460 |
| 4,672,305 | A | * | 6/1987 | Coleman | 324/72 |
| 4,792,806 | A | * | 12/1988 | Bent et al. | 342/465 |
| 5,757,322 | A | * | 5/1998 | Ray et al. | 342/460 |
| 5,959,815 | A | * | 9/1999 | Gilbert | 361/1 |
| 5,978,738 | A | * | 11/1999 | Brown | 702/3 |
| 6,462,665 | B1 | * | 10/2002 | Tarlton et al. | 340/601 |
| 6,683,609 | B1 | * | 1/2004 | Baron et al. | 345/419 |
| 6,768,946 | B2 | * | 7/2004 | Okabe et al. | 702/4 |
| 6,788,043 | B2 | * | 9/2004 | Murphy et al. | 324/72 |
| 6,791,311 | B2 | * | 9/2004 | Murphy et al. | 324/72 |
| 6,828,911 | B2 | * | 12/2004 | Jones et al. | 340/601 |
| 6,868,339 | B2 | * | 3/2005 | Murphy et al. | 702/4 |
| 6,961,662 | B2 | * | 11/2005 | Murphy | 702/4 |
| 7,016,785 | B2 | * | 3/2006 | Makela et al. | 702/4 |
| 2005/0197776 | A1 | * | 9/2005 | Makela et al. | 702/4 |
| 2005/0258971 | A1 | * | 11/2005 | Greenstein et al. | 340/601 |

OTHER PUBLICATIONS

Portable, and Hand held Lightning Detector/Storm Warning Device; Internet advertisement; At least as early as Jun. 4, 2004; www.lightningdetector.com.
Lightning Detector; Internet advertisement; At least as early as Jun. 4, 2004; www.weathermass.com.

* cited by examiner

*Primary Examiner*—Bryan Bui
*Assistant Examiner*—Toan M. Le

(57) ABSTRACT

A weather station for providing weather information to a user, especially weather information related to lightning and severe thunderstorm activity. In accordance with the present invention, the weather station includes one or more antennas for receiving GPS transmissions, weather radio transmissions, and a separate radio band, such as the AM radio band for use in detecting lightning strikes. The GPS signal is used to determine the position of the user. A lightning detector coupled to the antenna for receiving the AM (or other band) signal calculates the proximity of any detected lightning strikes. The national weather radio band antenna receives information from NOAA and similar organizations and presents it to the user in the normal fashion. In accordance with the present invention, the weather station may take storm data from NOAA and compare it to lightning proximity data that it has already obtained at a particular location and present to the user an indication of the relative location of the severe thunderstorm activity and its direction of movement.

13 Claims, 4 Drawing Sheets

WEATHER STATION

The present invention relates generally to the field of personal weather stations for detecting and reporting weather conditions, and more specifically relates to a weather station operable to both receive broadcast weather alerts and other information, and also to detect the presence and location of thunderstorm activity so as to better equip the user to avoid dangerous weather conditions.

BACKGROUND OF THE INVENTION

For many thousands of years, human beings were at the mercy of the elements. Changing weather conditions forced humans to seek shelter, find ways to protect themselves from the cold and heat, and occasionally to interrupt important life-sustaining activities, such as food gathering and hunting because of severe weather. For many people, the need to adjust was constant. Some weather conditions change relatively slowly, such as with the heating and cooling of the environment with the changing of the seasons. People often dealt with these changes simply by migrating from one area to another, or by making preparations during one season for dealing with changing weather conditions that they knew would come with the next. Other weather conditions change more rapidly, such as the sudden onset of thunderstorm or snowstorm, and humans would have to react to more quickly, presumably based their past experience with similar events. Some weather phenomena, however, are even more violent in nature, such as tornadoes, hurricanes, and flash floods, that are very difficult to prepare for even if some advanced warning of their onset has occurred.

Generally speaking, however, people became much more adept at being observant of existing environmental conditions, and using their past experience to predict the onset of certain of these events. The ability to realize that conditions are ripe for a thunderstorm of some force, for example, might give an astute observer a full day or longer to arrange activities so that shelter can be searched for or kept close at hand. While some ancient weather forecasting was tied to superstition and misunderstanding of the scientific principles behind weather conditions, many of these observations enabled them to predict future weather conditions even though they had little understanding of the underlying cause of those conditions.

The development of new and better shelters led to an increase in the safety and comfort of those individuals who were able to obtain them. Instead of relying simply on naturally occurring means of protection from the weather, people began to construct more and more elaborate shelters, some of which provided almost complete protection from ordinary weather events. This, combined with a gradual evolution to non-migratory lifestyles, enabled more and more people to stay relatively sheltered from environmental weather conditions for a large portion of the time. In fact, even with all of our modern technology, we are unable to have a very significant ability to alter weather conditions, so clothing and shelter remain our primary protections against the ravages of foul weather.

Nevertheless, even in modern times, people often spend a great deal of their time in the open outdoors and relatively far away from suitable shelter for all weather conditions. Unfortunately, generations of living in a sheltered environment has reduced the ability of the general population to make, on their own, accurate predictions of possibly dangerous weather activity. While some people who spend a great deal of time out of doors have managed, intentionally or inadvertently, to retain the ability to observe and plan for upcoming or eminent weather conditions, many also venture into the outdoors with very few of these skills.

One of the most violent and interesting weather conditions is lightning. Lightning, which almost everyone is familiar with, is the equalization of uneven accumulated electrical charges between the earth and some location in the atmosphere above it. While lightning may also equalize charges between two points in the atmosphere, such an event rarely poses harm to human beings who are on the ground. While a lightning strike that does reach the earth is a very localized event (as opposed to, for example, a hurricane), the destruction and potential for human injury at that particular location is very high. And the occurrence of lightning strikes, unlike some other weather events, is very common. This means that a person in the vicinity of atmospheric conditions that are conducive to the development of lightning activity are always at an elevated risk.

The atmospheric conditions that are conducive to producing lightning are often, though not universally, involved with violent thunderstorms. Aside from lightning effects, thunderstorms frequently produce heavy rains and strong winds, making observation of local weather conditions difficult. Since the numerous lightning discharges often associated with a thunderstorm will tend to rapidly and randomly occur, determining the user's location relative to a likely lightning strike location may be difficult. Many people are familiar with the method of calculating their own distance from an observed lightning strike by estimating the amount of time that passes from the visual manifestation of the lightning to the aural manifestation of a thunder clap associated with the lightning bolt. Because light travels much faster than sound, the delay between the two can give the observer an indication of how far away the lightning strike occurred. This method, however, may generally be used only to produce a rough estimate, and may be difficult to execute where extensive lightning activity makes it difficult to associate particular thunder claps with observed lightning bolts. The same problem is often inherent in trying to determine the observer's orientation with respect to a particularly heavy occurrence of lightning and the direction of its movement. This is especially a problem where local terrain such as hills and valleys affects the propagation of the sound waves that cause the observers to hear the thunder.

As mentioned above, several modern technological developments have enabled more advanced societies to more accurately predict impending weather conditions, even as they relate to relatively local areas. Not only has the observation of weather conditions become more systematic, that is, by observing and recording certain environmental factors over a wide area, but computer models have been used to evaluate this gathered data to form predictions that were impossible even a hundred years ago. These predictions, however, still tend to be broad in nature and are used to forecast weather for a wide area, which is useful, but does not provide an individual who is outdoors with all the information needed to make appropriate decisions concerning their activities. More specifically, while Van analysis of conditions such as those where thunderstorms and lightning might be expected can be performed, there remains little ability to translate such predictions into useful information for an individual on the ground in the outdoors. This individual is interested not only in the broader weather picture, but in the local weather activity that affects what he is doing at his present location. The present invention is directed to a personal weather station that can use both available data from larger weather forecasting entities and also locally collected data specifically focused on the observer's present location, to create a weather station that is able to provide useful information to an individual, especially with avoiding areas where dangerous lightning strikes may occur.

SUMMARY OF THE INVENTION

The present invention is directed to a weather station adapted for providing useful local weather information, especially concerning the occurrence of lightning. The weather station of the present invention utilizes information from publicly and almost universally available sources in combination with locally gathered data to provide a relatively complete picture of local weather conditions.

In one aspect, the present invention is a weather station including a broadcast-radio receiver for receiving broadcasts of local weather conditions from weather services, and specifically those weather services broadcast by the NOAA over weather band frequencies, and intermediate band receiver, such as an AM receiver, for use in detecting the occurrence of lightning events. The weather station of the present invention further includes a controller for controlling the various components and a processor for making calculations based on received data, and a memory for use in storing historical data that can also be used in certain calculations. So equipped, the weather station is able to determine the position of the occurrence of lightning events relative to the user, and to provide indications to the user which can be used for adjusting to the local weather conditions. The weather station of the present invention may also include a GPS receiver for receiving GPS satellite and other station broadcasts in order to determine the position of the weather station.

A more complete appreciation of the present invention and the scope thereof can be obtained from the accompanying drawings that are briefly summarized below, the following descriptions of the presently-preferred embodiments of the invention, and the appended claims.

DETAILED DESCRIPTION

The present invention is a weather station, and a method of using the weather station, for detecting certain local weather conditions and reporting their existence to the user. As well as receiving broadcast weather information relevant to the user and the user's position and providing that to the user as well. In a preferred embodiment, the information gathered from these resources is combined to form a complete and accurate picture of the local weather conditions.

Figure 1:
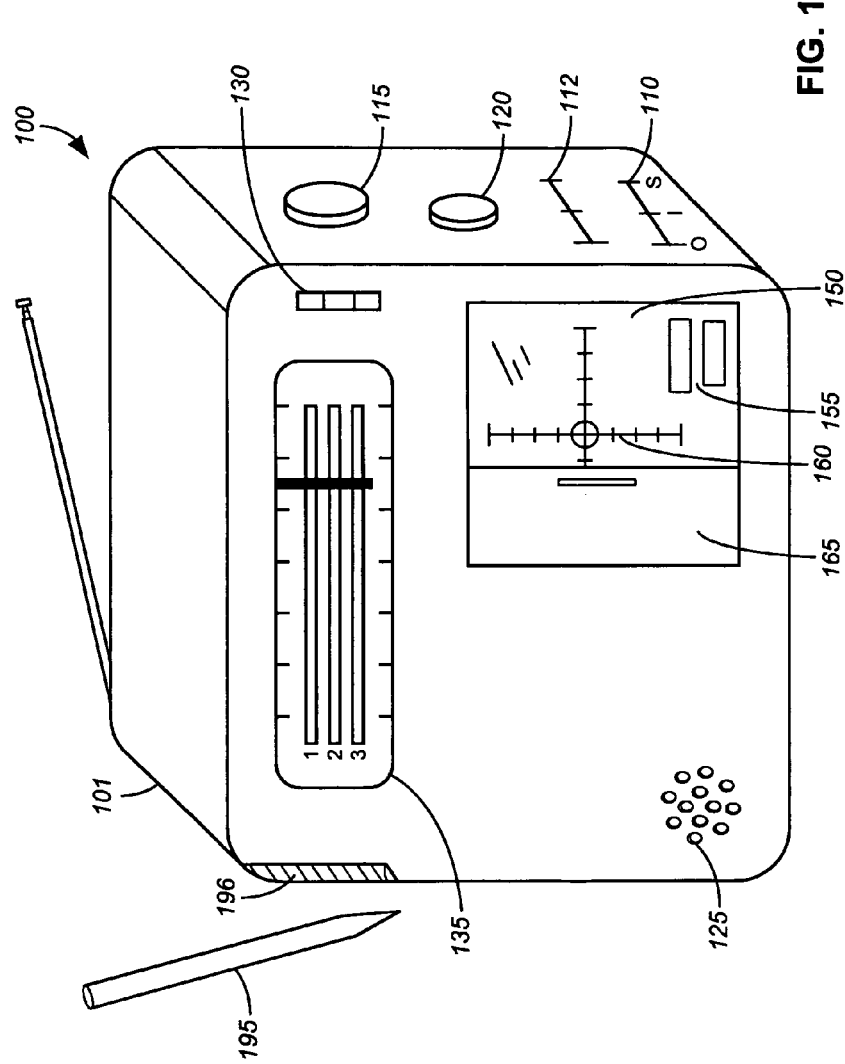
FIG. 1 is an illustration of the exterior of an exemplary weather station configured according to an embodiment of the present invention.

FIG. 1 is an illustration of the exterior of an exemplary weather station configured according to an embodiment of the present invention. Weather radio 100 includes at least one antenna 105 for receiving radio signals. Note, however, that more than one antenna (not shown in FIG. 1) may, and probably will be present because of the number of different types of radio receptions radio 100 is expected to use. The antenna 105 of FIG. 1 is a standard broadcast radio antenna and its ability to intercept certain broadcast radio signals is well known. In the embodiment of FIG. 1, weather station 100 includes a three-position switch 110 for use in turning the radio off, on, and placing the weather station is a stand-by position. A function switch 112 is used to turn the various features on, off, or place in a desired configuration. One of the functions of weather station 100 is to operate as a standard broadcast-radio receiver, and received audio signals are internally processed and enunciated through the speaker (not shown) positioned below speaker ports 125 formed in the housing 101 of weather station 100. As with an ordinary radio receiver, weather station 100 includes a external tuning knob 115, and a volume control knob 120. The tuning knob 115 adjusts the frequency that the radio is listening to (subject to the alternate means of selection described below). Tuning knob 115 also moves an indicator 136 movably positioned near frequency scale display 135 in order to let the user know approximately the frequency to which weather station 100 has been tuned. In the event that more than one frequency band may be used for receiving information to be enunciated through the speaker, a band selection switch 130 is also provided.

In accordance with the present invention, weather station 100 is operable to receive broadcasts transmitted by the National Ocean and Atmospheric Administration (NOAA). NOAA continuously broadcasts weather information that has been prerecorded, or uses a synthesized voice, that can be received on any radio receiver able to tune to the appropriate frequency, approximately 162 MHz. A number of separate channels using frequency bands that vary slightly above 162 MHz are used to broadcast weather information related to different regions of the country (frequency channels may be re-used in geographically distant regions). To receive the proper broadcast, a user checks on the particular frequency band used by NOAA for the area in which the user is located or just selectively listens to different NOAA channels until the received audio indicates that the proper station has been found. NOAA broadcasts are frequently referred to as originating from NOAA weather radio (NWR).

NWR also issues severe weather warnings in the form of broadcast specially coded messages that may be received by modern weather radios. The effect of receiving such a signal that corresponds to the area in which the radio is located may vary, but commonly includes the sounding of an audible alarm and actually turning on the audio portion of an NOAA broadcast if the user had not already done so. To receive these coded messages, sometimes referred to as NWR specific area message encoding (SAME) messages, the user may have to preset the radio to obtain signals affecting the area in which the preset indicates the user is located. (This presetting may be done by manipulating an internal or external switch or other use input device (none of which are shown in FIG. 1).)

In accordance with an embodiment of the present invention, the weather station 100 of FIG. 1 also includes a position display 150. Position display 150 indicates the position of the user, either as reported by the user or as automatically calculated by weather station 100 based on GPS signals. GPS (global positioning system) is a system of orbiting satellites that each send out continuous signals to indicate its position and the time the signal is sent. GPS satellites and other equipment operate according to close tolerances and are continually calibrated so that these signals are sent with a great deal of accuracy. A proper receiver located anywhere on the ground is able to receive the broadcast signal from at least three of the orbiting satellites at any one time. Using triangulation and the timing of the receipt of the GPS signals, the receiver can calculate its position with a reasonable degree of accuracy. Using a signal receive from a fourth satellite, or communicating with a ground-based GPS station, or both, the receiver can determine its position anywhere on the globe with an even greater degree of accuracy.

Weather station 100, as mentioned above, includes a GPS receiver and may utilize this position determination in a variety of ways. In one embodiment, coordinates, generally standard latitude and longitude coordinates, can be displayed on digital location readout 155 located on display 150. Alternately (or also) a local map may be displayed on display 150 behind processor 165 so that the user may compare their present position to a map of the area. A keypad 180 may be used for entering information, or a stylus manipulated by the user to touch the display screen in certain locations may also be used. The user, for example, may touch a particular location on the screen in order to obtain its coordinates or to obtain an estimation of the distance from other current locations to the point indicated. In this embodiment, a sliding door 165 is provided to cover and protect display screen 150 when it is not in use. Stylus 195 may be stowed in holder 196. As previously mentioned, the user may also enter position information if it is known to them. This manually-entered information may be input in such a way as to override any GPS calculations that have been made, or, alternately, the user may be informed that there is a difference in the entered information and the calculated information. The entered information may, for example, be reckoned by the user from a map of the area and a known benchmark near the user's present position. In either event, weather station 100 uses the appropriate position information in some of its calculations concerning present or nearby weather conditions.

Figure 2:
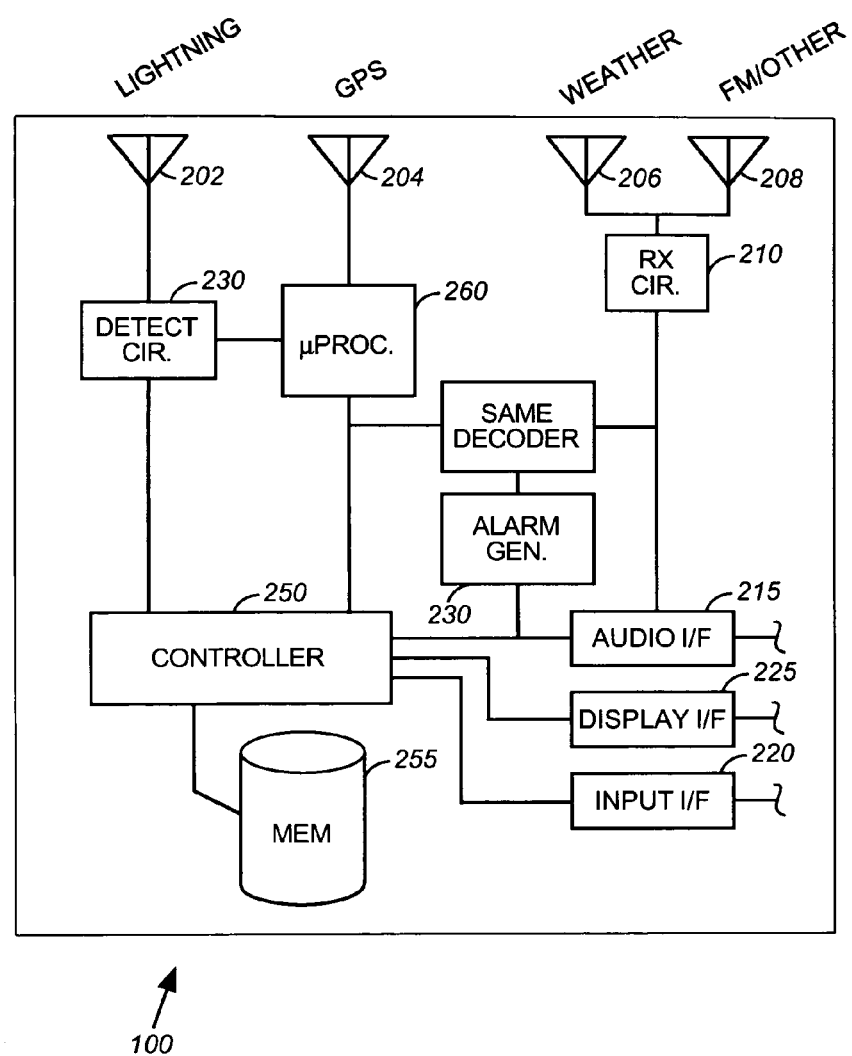
FIG. 2 is a simplified block diagram illustrating selected components of an exemplary weather station according to an embodiment of the present invention.

FIG. 2 is a simplified block diagram illustrating selected components of an exemplary weather station according to an embodiment of the present invention. Weather station 100 includes, in this embodiment, an antenna 206 for receiving weather band broadcast information, for example, NWR broadcasts and SAME messages. It also includes antenna 208 for receiving other FM broadcasts, short wave radio broadcasts, AM band broadcasts, or some other type of radio signal. In an alternate embodiment, weather station 100 may also be capable of communicating via a satellite telephone or cellular telephone network. Of course, where a single antenna may be used to receive multiple types of radio signals, using a single antenna may prove more efficient.

In yet another embodiment (not shown), weather station 100 is operable to communicate with similar weather stations in order to share information about weather conditions. (Another antenna may be required for this purpose.) Where multiple weather stations of this type are in a particular areae, even more information may be collected, and storms may be located and future conditions predicted with even greater accuracy.

In any event, antennas 206 and 208 represent the broadcast-radio antennas for weather station 100. Signals received at such antennas are processed by receive circuitry 210, and selectively played upon the weather station's speaker. Audio interface 215, shown in FIG. 2, processes the receive signal for playing on the speaker (not shown). As mentioned previously, the weather station 100 may also enunciate one or more alarms based on weather information that it either receives from an outside source or calculates on its own. In this case, alarm generator 230 will generate the appropriate alarm and audio interface 215 will process the generated alarm for playing on the speaker. Although no speakers are actually shown in FIG. 2, there may of course be two or more so that the alarm speaker is independent of that used for presenting broadcast radio.

Lightning antenna 202, which is a antenna for monitoring a certain frequency, for example, an AM frequency band signal, for disturbances that may reflect lightning strikes. Coupled to antenna 202 is a lightning detector 230 for processing the signal and estimating the intensity of the lightning. Calculations circuit required to determine this information may be performed by or with microprocessor 260. Proper calibration can make the lightning-detection capability of weather station 100 fairly accurate.

GPS antenna 204 is used to receive satellite broadcasts containing GPS information. This information is supplied to microprocessor 260 so that position calculations may be made.

The various components described above operate under the control of controller 250, memory 255 is used to store information needed for making the calculations and historical information that may be used to evaluate trends and weather conditions.

The information gathered by the weather station 100 in whatever manner will be most useful to the observer if a visual display is used to supplement whatever alarms or indicator lights are activated to represent certain conditions. Display interface 225 coupled to controller 250 drives a visual display of this type.

Figure 3:
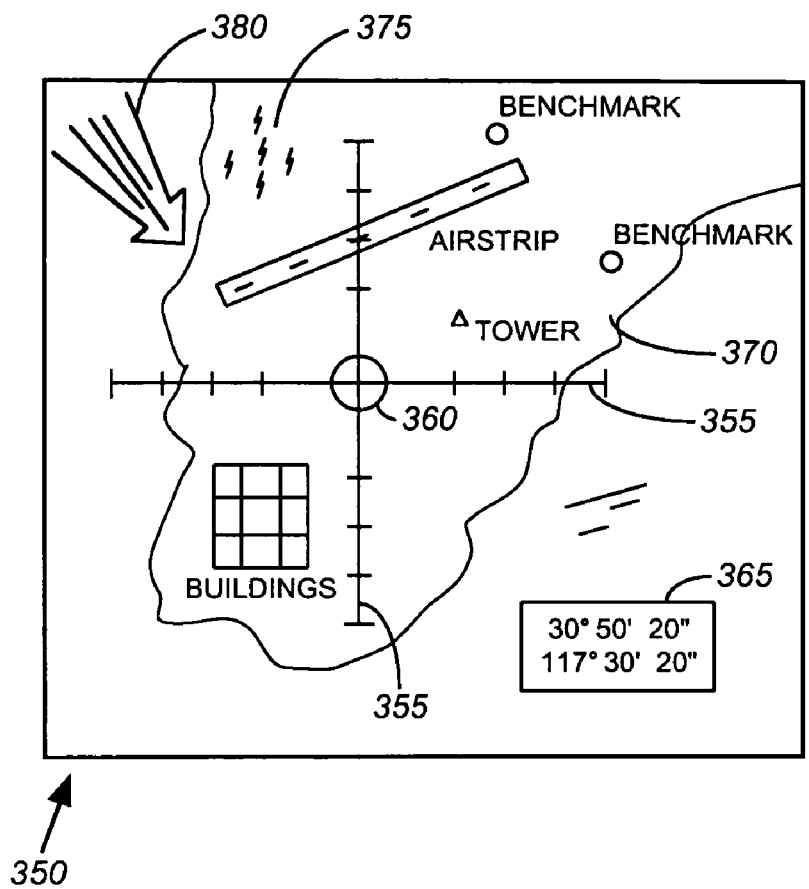
FIG. 3 is an illustration of an exemplary user-interface portion of the weather station of FIG. 1.

FIG. 3 is an illustration of an exemplary user-interface portion of the weather station of FIG. 1. As already noted in connection with FIG. 1, the visual display may be used in a variety of ways, and may be covered by a protective cover of some sort when not in use. In the embodiment of FIG. 3, the visual display 350 includes a crosshairs 355, the intersection 360 of which generally indicates the location of the weather-station 100 and, presumably, its user. Alternately, the crosshairs may intersect at another location, perhaps one the user has indicated a desire to travel to. In the embodiment of FIG. 3, the latitude and longitude of the observer are shown in window 365. Other types of position indicators may be used, such as map coordinates or even in some cases place names. In the background of the visual display is a map 370 of the area in which the weather station 100 is located, presuming such a map is available. Given the limitations of visual display 350, this map 370 reflects only one of a number of maps that are preferably stored in memory 255, so that the appropriate map may be called into use when necessary. The appropriate map is determined, of course, by position information as determined by the GPS location system. Also on the visual display are a series of lines 375 indicating the detection of lightning strikes in the vicinity of the weather station 100.

Note that in many cases, the weather station will not be able to determine the direction relative to the weather station of the lightning strike, only its intensity and time that it occurred. The location information used to display the lightning strikes on the visual display 350 may be arrived at in a number of ways.

In one embodiment, the weather station 100 receives a weather-related broadcast, which contains the general coordinates of a thunderstorm or other lightning producing phenomenon. Once these coordinates are obtained, of course, a position relative to the user may be determined and, in another embodiment, immediately following a single strong lightning strike the user may indicate, using a the stylus on the visual display (assuming it is touch sensitive), the approximate direction of the lightning strike. Other lightning strikes detected may be assumed to be in similar area unless otherwise noted by the observer. Of course, the information obtained in these two different manners may be combined. In many cases, of course, the weather station will be located in an area where it is surrounded by thunderstorm activity and lightning strikes may be occurring at various points all about the weather station. In this case, however, the position information relative to a single lightning strike is relatively unimportant to the user. The general location of the thunderstorm and the direction of its movement, however, will continue to be useful so that the observer may take steps to leave the area or to find suitable shelter until the thunderstorm is passed. The location of thunder strikes will be most useful, on the other hand, when single occurrences at some distance from the user, are in a specific direction displayed on the visual display.

Figure 4:
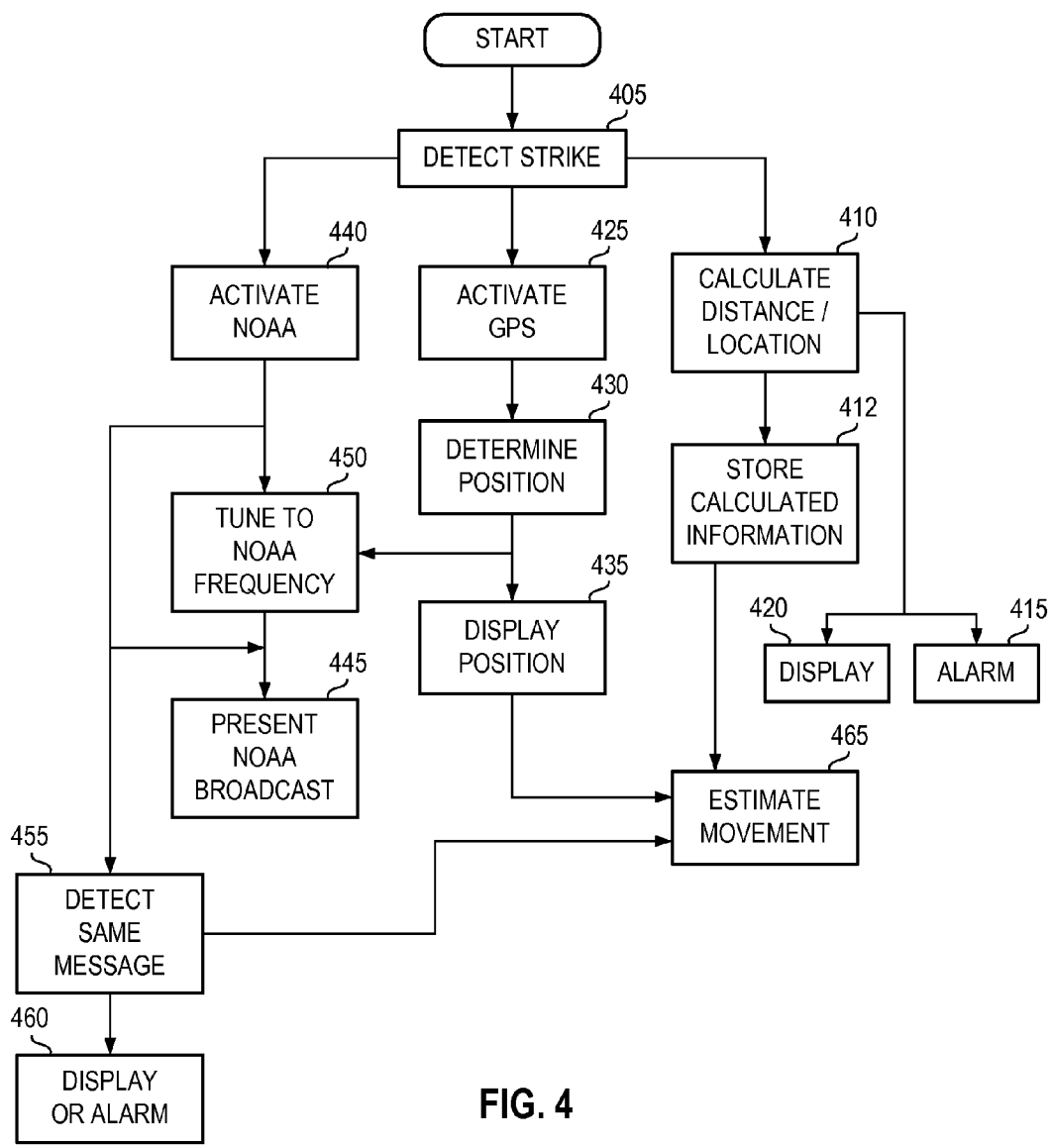
FIG. 4 is a flow diagram illustrating a method of weather analysis according to an embodiment of the present invention.

FIG. 4 is a flow diagram illustrating a method of weather analysis according to an embodiment of the present invention. This is only one of several methods that may be implemented in radio station 100, of course, and the sequence of events shown may also occur in any other logically-consistent order. At START, it is assumed that the weather station 100 has been placed in a standby condition (for example, using three-position switch 110). In standby mode, most functions of weather station 100 are off unless and when a certain event occurs, except of course for those components necessary for detecting such events.

One such event is a lightning strike. When weather station 100 detects a lightning strike at step 405, in the method 400 of FIG. 4, it calculates its approximate distance from the user (step 410). At that time, an alarm may be activated (step 415), such as an audio alarm. In a preferred embodiment, this alarm is only sounded when the lightning strike is less than a certain selected distance away. The user will almost certainly hear the resultant thunder, but may ignore it if the strike is a long way off.

In addition, a lightning strike position indicator may be shown on display 350 (step 420), presuming one can be accurately calculated. Instead of strike indicators 375 (shown in FIG. 3), for example, if the direction of the strike is not yet known, the strike position indicator may simply be a circle representing distance (not shown).

The weather station may have a GPS receiver. Following lightning strike detection at step 405, weather station 100 may also activate its GPS receiver, if it is not already on (step 425). Then the position of the weather station may be calculated (step 430) and, if desired, displayed in window 365 (shown in FIG. 3)(step 435).

At the same time, detecting a nearby lightning strike at step 405 may also activate the NWR receiver (step 440). If an NWR frequency has been selected, the appropriate broadcast may be presented to the user (step 445), that is, played on the speaker of weather station 100.

If the GPS has made a position determination at step 430, this information may be used to tune to the appropriate frequency for receiving NOAA broadcasts (step 450)—which may of course be the same on that has been manually selected or used by default. If the GPS-determined position is different than the one currently in use, then the frequency may be changed, or the user may be in some way queried as to whether the change should be made (steps not shown).

The GPS position determination may also be used to set the location (that is, the location-appropriate code) for selectively receiving SAME messages from NOAA. If a SAME message is detected (step 455), based either on a preset (or default) location, or one determined using GPS, then the weather station presents (step 460) an audio or visual alarm appropriate to the condition being warned of in the SAME message.

If further lightning strikes are detected at step 405, the various functions described above as being activated do not, of course, have to be reactivated (unless placed back on standby for some reason). The weather station 100 will perform a distance/location calculation at step 410. This may be done in similar fashion to the first calculation (described above), but may also include additional information such as the distance to the previous lightning strike. If enough such information is collected, calculated, and stored, the movement of the storm may be estimated (step 465).

Once estimated, the movement of the storm may also be represented on the visual display of weather station 100. This could be done in a number of ways, for example using arrow 380 on the display 350 of FIG. 3.

Although multiple lightning strikes are one way to estimate storm movement, perhaps aided by user input regarding the direction to the strikes, other inputs may be utilized as well. For example, NOAA broadcasts may contain information regarding storm location and movement that could be taken into account. Or information received from other compatible weather stations in the area may be used, if weather station 100 is capable of such communications. Hikers dispersed in a national forest, for example, may be able to determine the relative location and movement of storms quite accurately, based on an evaluation of the data collected by each of them.

FIG. 4 is only an exemplary embodiment of the present invention, and is not intended to imply that the lightning detector and weather radio are not capable of separate operation, as the GPS position location is required.

The previous descriptions are of preferred examples for implementing the invention, and the scope of the invention should not necessarily be limited by this description. The scope of the present invention is defined by the following claims

What is claimed is:

1. A portable weather station, operable to detect SAME (Specific Area Encoding) messages, said portable weather station comprising:
    a lightning detector for detecting the occurrence of lightning;
    a broadcast-radio receiver for receiving weather-related broadcasts; and
    a user display for visually displaying a position at which the occurrence of the lightning is detected by said lightning detector relative to a location of the portable weather station based on a location contained in a SAME message and a location entered by a user.

2. The weather station of claim 1, wherein the broadcast radio receiver is operable to receive NWR (NOAA (National Oceanographic and Atmospheric Admistration) Weather Radio) broadcasts.

3. The weather station of claim 1, further comprising a speaker for presenting the weather-related broadcasts in audio format for a user of the weather station.

4. The weather station of claim 1, further comprising user-interface means for permitting a user to enter location information.

5. The weather station of claim 1, further comprising a GPS receiver for receiving GPS signals.

6. The weather station of claim 1 wherein the lightning detector is operable to estimate the intensity of detected lightning.

7. The weather station of claim 6, further comprising a memory for storing information concerning at least one lightning strike.

8. The weather station of claim 7, wherein the information includes the estimated intensity and the time of the at least one lightning strike.

9. The weather station of claim 8, wherein the at least one lightning strike is a plurality of lightning strikes, and further comprising a controller that is operable to compare intensity information relative to the time each lightning discharge occurred to estimate a direction of movement.

10. The weather station of claim 9, wherein the controller is further operable to calculate whether lightning-strike intensity is increasing or decreasing.

11. The weather station of claim 10, wherein the weather station comprises a user interface for indicating changes in lightening-strike intensity.

12. The weather station of claim 1, further comprising a location display.

13. A portable weather station comprising:
- a lightning detector for detecting the occurrence of lightning;
- a broadcast radio receiver for receiving weather-related broadcasts;
- a GPS receiver for receiving GPS signals; and
- a user display for visually displaying a position at which the occurrence of the lightning is detected by said lightning detector relative to a location of the portable weather station based on a location calculated by the GPS and a location information entered by a user.

\* \* \* \* \*